United States Patent
Duggal et al.

(10) Patent No.: US 12,498,932 B1
(45) Date of Patent: Dec. 16, 2025

(54) PHYSICAL REGISTER SHARING

(71) Applicant: Apple Inc., Cupertino, CA (US)

(72) Inventors: Deepankar Duggal, Sunnyvale, CA (US); Richard F. Russo, San Jose, CA (US); Haoyan Jia, Ellicott City, MD (US)

(73) Assignee: Apple Inc., Cupertino, CA (US)

( * ) Notice: Subject to any disclaimer, the term of this patent is extended or adjusted under 35 U.S.C. 154(b) by 76 days.

(21) Appl. No.: 18/532,836

(22) Filed: Dec. 7, 2023

Related U.S. Application Data

(60) Provisional application No. 63/585,990, filed on Sep. 28, 2023.

(51) Int. Cl.
*G06F 9/38* (2018.01)
*G06F 9/30* (2018.01)

(52) U.S. Cl.
CPC ............ *G06F 9/384* (2013.01); *G06F 9/3012* (2013.01)

(58) Field of Classification Search
CPC ..... G06F 9/384; G06F 9/30029; G06F 9/3012
See application file for complete search history.

(56) References Cited

U.S. PATENT DOCUMENTS 5,630,149 A * 5/1997 Bluhm .................... G06F 9/384
    712/217
5,937,178 A * 8/1999 Bluhm ................ G06F 9/30141
    711/212
6,336,160 B1 * 1/2002 Eickemeyer ............ G06F 9/384
    712/217
6,393,546 B1 * 5/2002 Witt ...................... G06F 9/3836
    712/E9.027

(Continued)

FOREIGN PATENT DOCUMENTS

| CN | 104951281 A | 9/2015 |
| CN | 104509026 B | 4/2018 |
| WO | 00/04444 A1 | 1/2000 |

OTHER PUBLICATIONS

Ergin, Oguz. Register file optimizations for superscalar microprocessors. Dissertation. State University of New York at Binghamton, 2005. 172 pages (Year: 2005).*

(Continued)

*Primary Examiner* — Keith E Vicary
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to physical register sharing. In some embodiments, a processor includes, in a register file, physical registers of a largest architected register size for a given operand type defined in an instruction set architecture (ISA). A register rename circuit of the processor is configured to assign a first physical register to an architected register of the largest architected register size. The register rename circuit is also configured to assign a first portion of a second physical register to a second ISA-defined architected register of a smaller size than the largest architected register size and a second portion of the second physical register to a third ISA-defined architected register of the smaller size. In the second assignment, the second and third architected registers of the smaller size are separate and distinct registers in the ISA.

17 Claims, 9 Drawing Sheets

(56) References Cited

U.S. PATENT DOCUMENTS

| | | | | |
|---|---|---|---|---|
| 7,840,783 | B1* | 11/2010 | Singh | G06F 9/384 |
| | | | | 712/217 |
| 10,089,077 | B1* | 10/2018 | Wang | G06F 7/505 |
| 10,228,946 | B2* | 3/2019 | Bradbury | G06F 9/30098 |
| 2001/0004755 | A1 | 6/2001 | Levy et al. | |
| 2004/0128573 | A1* | 7/2004 | Sperber | G06F 9/384 |
| | | | | 713/320 |
| 2005/0027968 | A1* | 2/2005 | Rupley, II | G06F 9/30036 |
| | | | | 712/E9.05 |
| 2006/0236078 | A1 | 10/2006 | Sartorius et al. | |
| 2006/0265555 | A1* | 11/2006 | Davis | G06F 9/30112 |
| | | | | 711/147 |
| 2012/0110305 | A1* | 5/2012 | Lien | G06F 9/30123 |
| | | | | 712/E9.025 |
| 2013/0086364 | A1 | 4/2013 | Gschwind et al. | |
| 2013/0086367 | A1 | 4/2013 | Gschwind et al. | |
| 2013/0290680 | A1 | 10/2013 | Keller et al. | |
| 2013/0290681 | A1 | 10/2013 | Keller et al. | |
| 2014/0164740 | A1 | 6/2014 | Gschwind et al. | |
| 2014/0281415 | A1* | 9/2014 | Burgess | G06F 9/30098 |
| | | | | 712/217 |
| 2015/0134935 | A1* | 5/2015 | Blasco | G06F 9/384 |
| | | | | 712/220 |
| 2017/0192789 | A1* | 7/2017 | Malladi | G06F 9/30038 |
| 2024/0004664 | A1* | 1/2024 | Kosuru | G06F 9/30123 |

OTHER PUBLICATIONS

Kondo, Masaaki, and Hiroshi Nakamura. "A small, fast and low-power register file by bit-partitioning." In 11th international symposium on high-performance computer architecture, pp. 40-49. IEEE, 2005. (Year: 2005).*

Nandivada, V. Krishna, and Rajkishore Barik. "Improved bitwidth-aware variable packing." ACM Transactions on Architecture and Code Optimization (TACO) 10, No. 3 (2013): 1-22. (Year: 2013).*

Pita, Alan, and Nadeem Malik. "Sectored renaming for superscalar microprocessors." In 1999 IEEE International Performance, Computing and Communications Conference (Cat. No. 99CH36305), pp. 59-64. IEEE, 1999. (Year: 1999).*

Wang, Xin, and Wei Zhang. "Gpu register packing: Dynamically exploiting narrow-width operands to improve performance." In 2017 IEEE Trustcom/BigDataSE/ICESS, pp. 745-752. IEEE, 2017. (Year: 2017).*

ARM® Cortex®—A Series Version: 1.0: Programmer's Guide for ARMv8-A, 2015, 296 pages.

Komal et al., "Virtual register renaming: Energy efficient substrate for continual flow pipelines," GLSVLSI 2013—Proceedings of the ACM International Conference of the Great Lakes Symposium on VLSI (2013), pp. 43-48.

Mageda et al., "Virtual register renaming," Architecture of Computing Systems, ARCS 2013—26th International Conference, Proceedings (2013), vol. 7767 LNCS, pp. 86-97.

* cited by examiner

PHYSICAL REGISTER SHARING

PRIORITY CLAIM

The present application claims priority to U.S. Provisional App. No. 63/585,990, entitled "Physical Register Sharing," filed Sep. 28, 2023, the disclosure of which is incorporated by reference herein in its entirety.

BACKGROUND

Technical Field

This disclosure relates generally to processors, and, more specifically, to register renaming used by processors.

Description of the Related Art

Processors execute instruction set architecture (ISA) defined instructions by fetching them from memory and storing related data temporarily in registers, which are also specified by the ISA. These registers serve as data storage locations where the processor performs operations, such as arithmetic calculations and logical comparisons, using the instruction's operands. The efficient management and utilization of registers are important for the CPU's ability to execute instructions quickly and accurately.

Typically, processors employ register renaming as an optimization technique in modern processor execution. Register renaming employs a mapping mechanism to assign ISA-defined architected registers to actual physical registers in the processor's register file, allowing multiple instructions to share the same architected registers without conflicts. This process reduces dependencies of instructions on particular registers, thus enhancing CPU performance.

DETAILED DESCRIPTION

Figure 1:
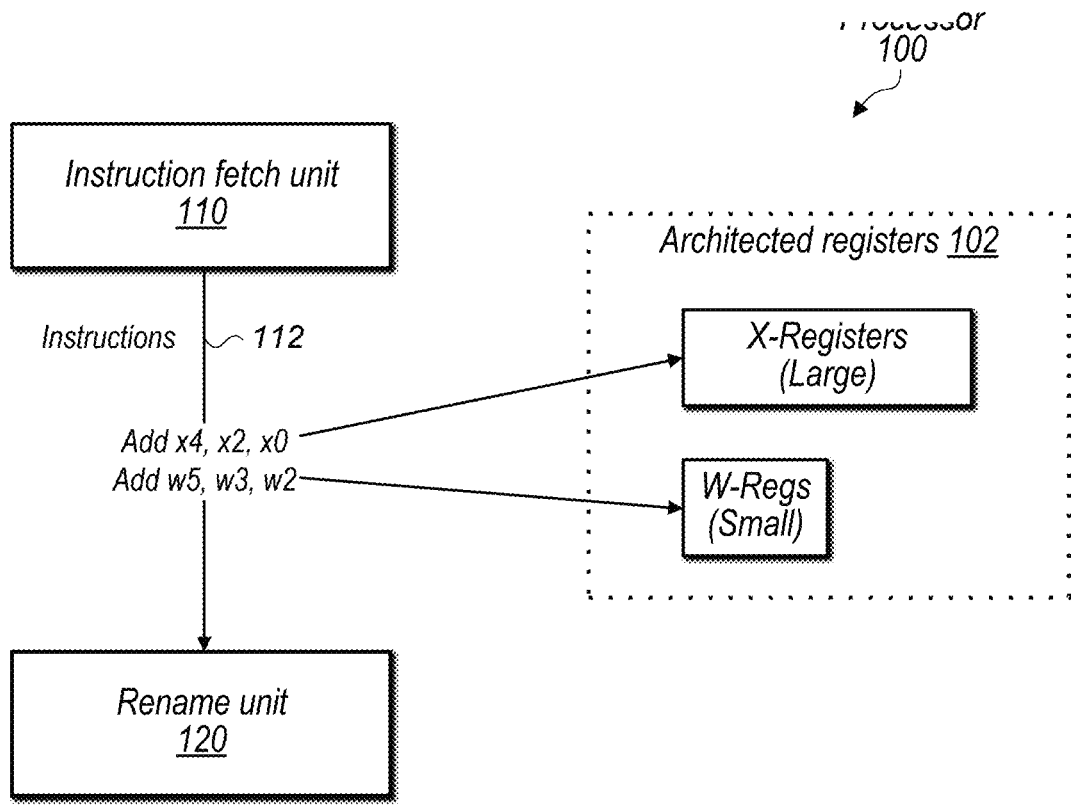
FIG. 1 is a block diagram illustrating an example of a processor configured to implement physical register sharing.
Figure 1:
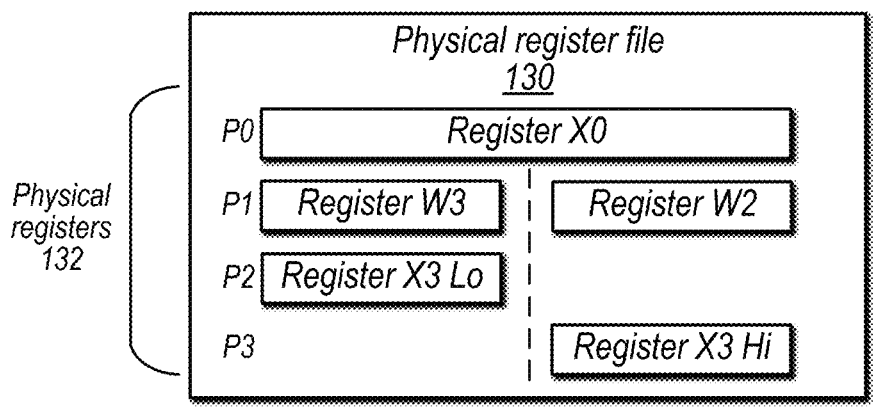

Many instruction set architectures (ISAs) allow for different architected register sizes. For example, the ARM® instruction set architecture defines both 64-bit architected registers and 32-bit architected registers, which can be referred to as X-registers and W-registers, respectively. This may be used, for example, to accommodate different datatypes, where larger registers can be used for floating point numbers and smaller registers can be used for integers. In some cases, a W-register may be assigned to a physical register that has enough "space" (e.g., bits) for an X-register such that the lower half of the physical register contains the content of the W-register, but the upper half may be all zeros, all ones, or some other unused value that is not used when the W-register is accessed.

This can result in significant unused storage space in applications that make significant use of smaller architected registers. In one example, a processor executing code sequences was found to use 70-80% X-registers and 20-30% W-registers, with both types being stored in physical registers that can accommodate the larger X-registers. In that scenario, storing W-registers in the more capacious physical registers results in a significant waste of storage space that could be used by the more frequently used X-registers, possibly limiting the speculative window (e.g., the number of instructions a processor may simultaneously execute out-of-order) in a processor.

Simply increasing the size of the physical register file to provide more space for registers, however, may slow down register accesses and incur area and power penalties. Furthermore, this approach may not alleviate issues caused when too many W-registers are being used, as the same proportion of bits would still go unused. The inventors thus propose physical register sharing in which physical registers of a large size can be partitioned during register renaming to accommodate storing multiple architected registers.

Additional circuitry is introduced including in the register rename stage of the pipeline, to support physical register sharing. This includes, for example, multi-bit free lists to indicate which register portions are available for architected registers. In further embodiments, the processor may ensure that it does not run out of physical registers of larger architected registers by setting a threshold on the number of physical registers that can be partitioned.

Thus, a single physical register can hold multiple architected registers, making use of otherwise unused physical register portions in prior implementations. For example, code that mostly uses smaller registers may have more available registers than previous implementations, since multiple smaller architected registers may be stored in a single physical register. As another example, applications that mostly use larger architected registers may have more available physical registers if they use at least some smaller architected registers since smaller architected registers are "packed" in split registers, resulting in more physical registers becoming available for larger architected registers.

Furthermore, the techniques described can be used without an increase in register file width. The overhead logic described above to implement register sharing may occupy less area than a bigger physical register file (PRF) while still providing more available registers to applications. This approach can thus provide a comparable register file area to previous implementations but enable more architected registers to be used within that same area.

Turning now to FIG. 1, a block diagram of a processor 100 supporting physical register sharing is depicted. In the illustrated embodiment, processor 100 includes instruction fetch unit (IFU) circuitry 110, rename unit circuitry 120, and physical register file circuitry 130. In some embodiments, processor 100 may be implemented differently than shown such as including more physical registers 132, using different names for architected registers than X and W, etc.

Instruction fetch unit 110, in various embodiments, is circuitry configured to retrieve instructions 112, which may be obtained from memory or an instruction cache as will be described with FIG. 4. Instructions 112 may correspond to any suitable ISA such as ARM®, x86, MIPS®, PowerPC®, etc. As shown, instructions 112 specify architected registers 102 that do not directly index physical registers 132; rather, architected registers 102 are logical/virtualized registers that are later assigned to physical registers 132. For example, in FIG. 1, an instruction 112 "Add X4, X2, X0" references three X architected registers 102 corresponding to a larger (e.g., 64-bit) register size. Although specific references will be made herein to a large register size as being an "X-register" and a smaller register size as being a "W-register" (as defined in the ARM® ISA), these are merely used as example labels to connote architected registers having different sizes in order to simplify the explanation presented herein. Accordingly, in some embodiments, more than two architected register sizes may be used. In some embodiments in which a different ISA is being used, architected registers 102 may have different ISA-defined names and other suitable sizes.

Rename unit 120, in various embodiments, is circuitry configured to rename architected registers 102 to corresponding physical registers 132 of physical register file 130. After the architected register 102 is assigned to a physical register 132, its bits can be stored at the corresponding physical register. As shown for example, bits of architected register X0 are stored in bits of corresponding physical register P0 in physical register file 130. As will be discussed in more detail below with respect to FIG. 4, rename unit 120 tracks the architected-to-physical register assignments and is configured to return corresponding physical registers of an instruction's architected register(s).

As noted above, one approach to rename registers of different sizes is assigning architected registers of any size (e.g., both X- and W-registers) to physical registers that have enough bits to accommodate the largest possible register sizes (here, X-registers). But, as discussed, this can result in a significant amount of unused register space. For example, when performing a W-rename for a 32-bit W architected register, this can result in 32 unused bits in an embodiment in which physical registers 132 are 64-bits wide.

As noted above, however, rename unit 120 is configured to implement register sharing in which physical register file 130 is partitioned such that different portions of physical register 132 can be assigned to multiple architected registers 102. For example, as shown in FIG. 1, register unit 120 can assign respectively a W-register W3 and another W-register W2 to high and low portions of a physical register P1. It is important to note in this example that W2 and W3 are architected registers 102 that are separate and distinct in the ARM® ISA, as they are not defined in the ISA as corresponding to the same architected register—and despite them being mapped to a single physical register P1. Separate and distinct architected registers stand in contrast to, for example, x86's extended architected register EAX, which is defined in the ISA as including a 32-bit portion referenced as EAX, a 16-bit portion AX, and 8-bit portions referenced AH and AL. Accordingly, rename unit 120's ability to assign portions of physical registers 132 goes beyond merely being able to perform a rename of the EAX register. For example as also shown, rename unit 120 can split an architected register X3 among multiple physical registers 132 such as the low bits of X3 being assigned to a portion of physical register P2 and the high bits of X3 being assigned to a portion of physical register P3—or, in the context of x86, rename unit 120 can store the architected register AH in a first physical register 132 and the architected register AL in a second physical register 132. Being able to use individual portions of physical registers 132 for renaming can significantly improve the utilization of physical register file 130 in a manner that achieves the effect of having an even larger register file 130.

Additional components used by rename unit 120 will be discussed in greater detail with respect to FIGS. 2 and 3.

Figure 2:
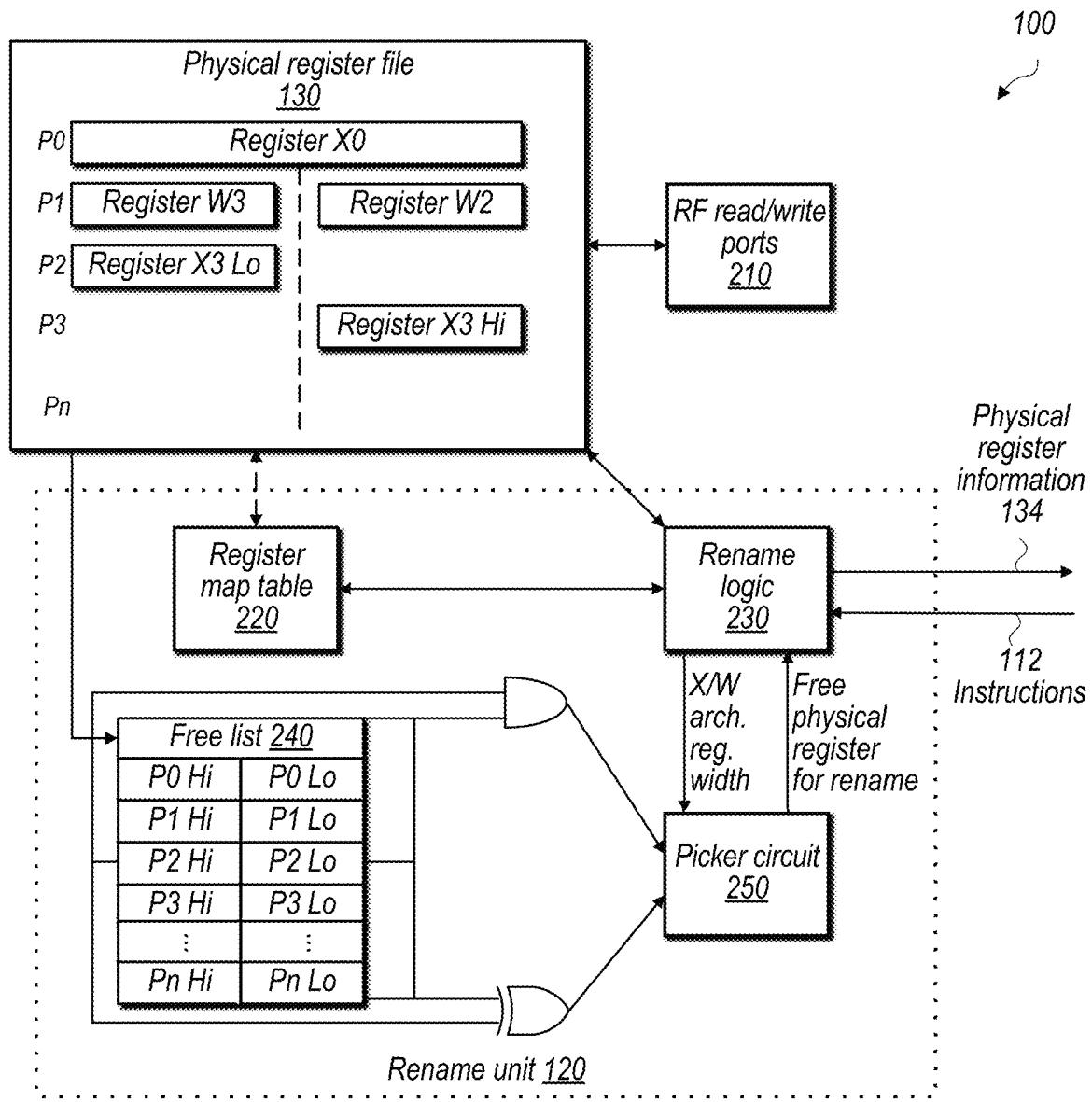
FIG. 2 is a block diagram illustrating an example of a rename unit of the processor.

FIG. 2 is a block diagram illustrating rename unit 120 and physical register file 130. In the illustrated embodiment, rename unit 120 (depicted in dashed lines) further includes register map table circuitry 220, rename logic circuitry 230, free list circuitry 240, and picker circuit 250. In other embodiments, rename unit 120 may be implemented differently than shown.

Register map table 220, in various embodiments, is circuitry configured to describe the assignments of architected registers 102 to physical registers 132 of PRF 130. As will be discussed below, rename logic 230 may modify values of table 220 during register renames. There are several ways of representing assignment of physical to architected registers in table 220. In an example embodiment, a table 220 is indexed by architected register where each entry for an architected register specifies: the physical register that is assigned to the architected register, an indication of the width of the architected register (e.g., X-register or W-register), and an indication of which portion the architected register occupies within the corresponding physical register (e.g., high bits or low bits). In other embodiments, table 220 is organized and indexed by physical register portion. Register map table 220 may also include other indicators such as a valid bit or an indicator of whether a particular physical register is partitioned. Table 220, in some embodiments, is implemented as a content addressable memory (CAM) whose entries indexed by an input architected register.

Free list 240 is circuitry configured to describe which physical register portions of PRF 130 are available for rename. As shown, entries of free list 240 are coupled to logic gates that each output availability for register renames at a particular size. The AND gate outputs indexes for physical registers available for X-renames, as both bits being valid would indicate that both physical register portions are available for an X-register. Similarly, the XOR gate outputs indexes for physical register portions available for W-renames, as those have already been partitioned for a W-register but still have another portion available for another W-register.

Picker circuit 250, in various embodiments, is circuitry configured to output index(es) for one or more free physical registers (or physical register portions) that are available for a selected rename size (e.g., X-rename vs. W-rename). In some embodiments, picker circuit 250 includes a multiplexer (MUX) to select which gate to use (e.g., an exclusive or (XOR) gate for a W-rename, AND gate for an X-rename). The MUX output may then be input into a priority encoder that selects the smallest available physical register index (or register portion index) for return to rename logic 230. Thus, rename unit 120 can receive, from picker circuit 250, an index of an available physical register or register portion during a rename.

Rename logic 230, in various embodiments, is circuitry configured to determine whether a rename is needed for architected register(s) of instructions 112 prior to sending physical register information 134. In some embodiments, rename logic 230 first checks register map table 220 (e.g., via a CAM) to determine whether or not it has previously assigned a physical register for the architected register. If so, rename logic 230 returns the corresponding physical register information (which may describe a physical register or a physical register portion depending on the architected register size). Otherwise, rename logic 230 determines that register assignment is needed and assigns the architected register to a physical register (or physical register portion) selected by picker circuit 250 and updates register map table 220 and free list 240 to reflect the assignment. Moreover, rename logic 230 may perform additional operations such as resetting valid bits during a rename, as will be discussed in more detail with respect to FIG. 3. In some embodiments, rename logic 230 is configured to implement Tomasulo's register renaming algorithm, but other register renaming algorithms may be implemented as well.

To improve usage of physical registers, rename logic 230 may be configured to attempt to initially perform W-renames using physical registers that have already been used in a rename, so that unused physical registers are still available for X-renames. But in some cases, rename logic 230 may find (e.g., via picker circuit 250) that no such physical register portion is available for the W-rename (e.g., all outputs of the XOR gate are 0). This may be the case when no W-registers have been assigned yet in table 220, or when all partitioned registers have already been taken. To address this, rename logic 230 may be configured to partition an available physical register for a W-rename by selecting (e.g., via picker circuit 250) a physical register available for an X-rename (as it has all its portions available), and assigning a portion of the now-partitioned physical register to the W-register. In some embodiments, rename logic 230 sets a bit at register map table 220 and/or free list 240 to indicate the partition.

In some embodiments, processor 100 is configured to maintain a threshold number of physical registers for X-renames that cannot be used for W-renames. For example, if processor 100 determines for a given W-rename, that the potential partitioning caused by the rename would cause the number of registers available for X-rename to fall below a certain threshold, it may accordingly stall the W-rename until more physical registers are available such that the threshold number is no longer violated by performing the W-rename. This may prevent running out of registers for X-renames, which may improve performance of processor 100. In some embodiments, this threshold may be stored in a software-accessible register that allows software to update the threshold depending on the software's own register usage. For example, an operating system may detect that code being executed only uses W-registers (e.g., due to its age) and determine that the threshold can be one register (or even zero, in some cases).

Rename unit 120 is configured to return, in response to either performing a rename or determining that there already is a mapping, physical register information 134 to processor 100. In one embodiment, physical register information 134 is used to index physical register file 130 and thus specifies: the size of the architected register, the corresponding physical register index (P0-P4), and, in the case of a small architected register, an index of the portion to which the architected register is assigned. For example in the depicted embodiment, an instruction specifying architected register W3 has physical register information values of (W, P1, Hi). These values may be then used by processor 100 to execute instructions 112, which in some cases involve issuing read/write requests to PRF 130 via ports 210. For example, processor 100 may use physical register information 134 to access physical registers values corresponding to architected registers and use those values as operands in instructions issued to execution unit 140.

Note that free list 240 and coupled circuitry may differ based on the number of portions a physical register can be split into. For example, in rename circuits where physical registers can be partitioned as to include four architected registers, entries of free list 240 would be 4-bits wide. Select signals, multiplexers, and logic gates would similarly be wider. Register map table 220 may also be wider to accommodate the additional mapping information included in a four-way partitioned physical register.

Figure 3:
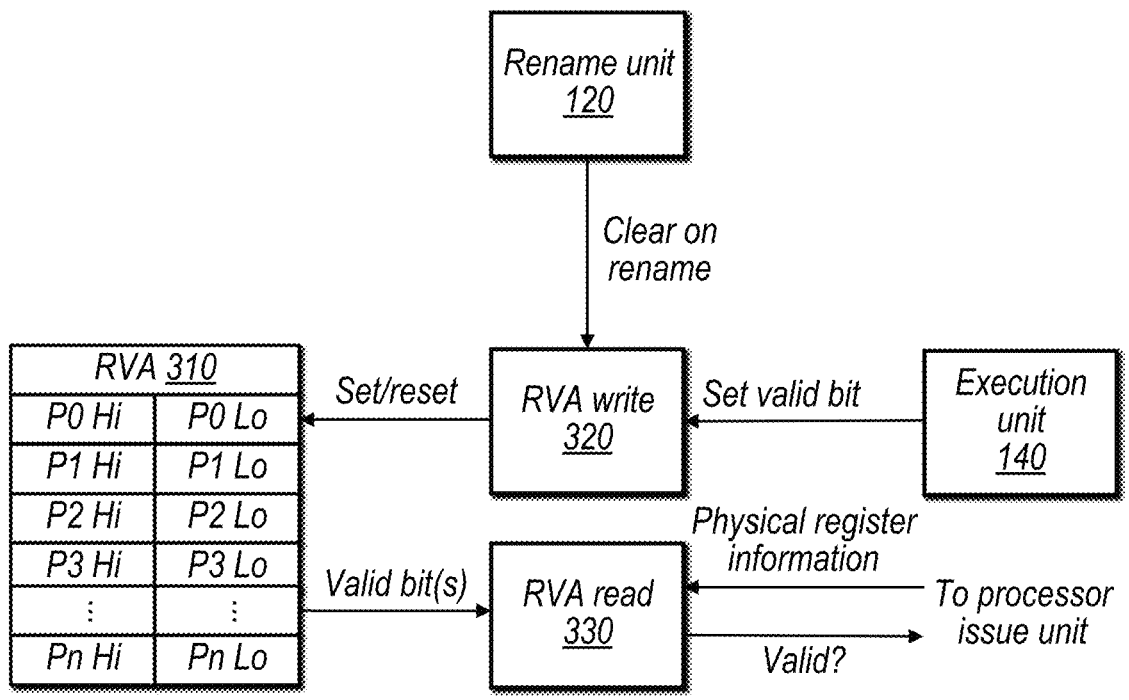
FIG. 3 is a block diagram illustrating an example of a register valid array in the processor.

Turning now to FIG. 3, a block diagram of a processor maintaining a register valid array (RVA) is depicted. As shown, processor 100 includes various components that communicate with RVA 310 by using RVA write circuitry 320 to maintain RVA 310 and RVA read circuitry 330 to read RVA 310 values. In some cases, other processor components may communicate with RVA 310.

RVA 310, in various embodiments, is circuitry configured to describe the validity of the data written to physical registers. As shown, RVA 310 has a valid bit entry for each physical register portion, which indicates whether the portion includes a valid (current) value of the corresponding architected register. As will be discussed below, RVA read 330 is configured to return the valid bits corresponding to input physical register information. Note that analogously to free list 240, entries of RVA 310 may also include more than two bits in cases where physical registers are partitioned for assignment to more than two architected registers.

As shown, various circuits in processor 100 are configured to maintain RVA 310 throughout the lifetime of a register assignment. When a write to an architected register is complete, execution unit 140 sets, via RVA write 320, corresponding bit(s) at RVA 310 to indicate validity. When rename unit 120 updates (e.g., re-assigns or removes) a particular architected register's assignment, it also clears via RVA write 320 corresponding RVA 310 bits to indicate that the value at PRF 130 is no longer valid.

Maintaining RVA 310 can be useful in a pipelined context as it may help solve various dependencies between instructions and pending instructions. For example, consider a read-after-write (RAW) scenario in which a processor is executing an instruction requesting to read a particular architected register after a pending write to that register is complete. As will be discussed in more detail with respect to FIG. 4, processor 100 may be configured, when executing the read request, to first check (e.g., via an issue unit using RVA read 330) and wait until RVA bits become valid, indicating that pending writes to the physical register are complete.

Figure 4:
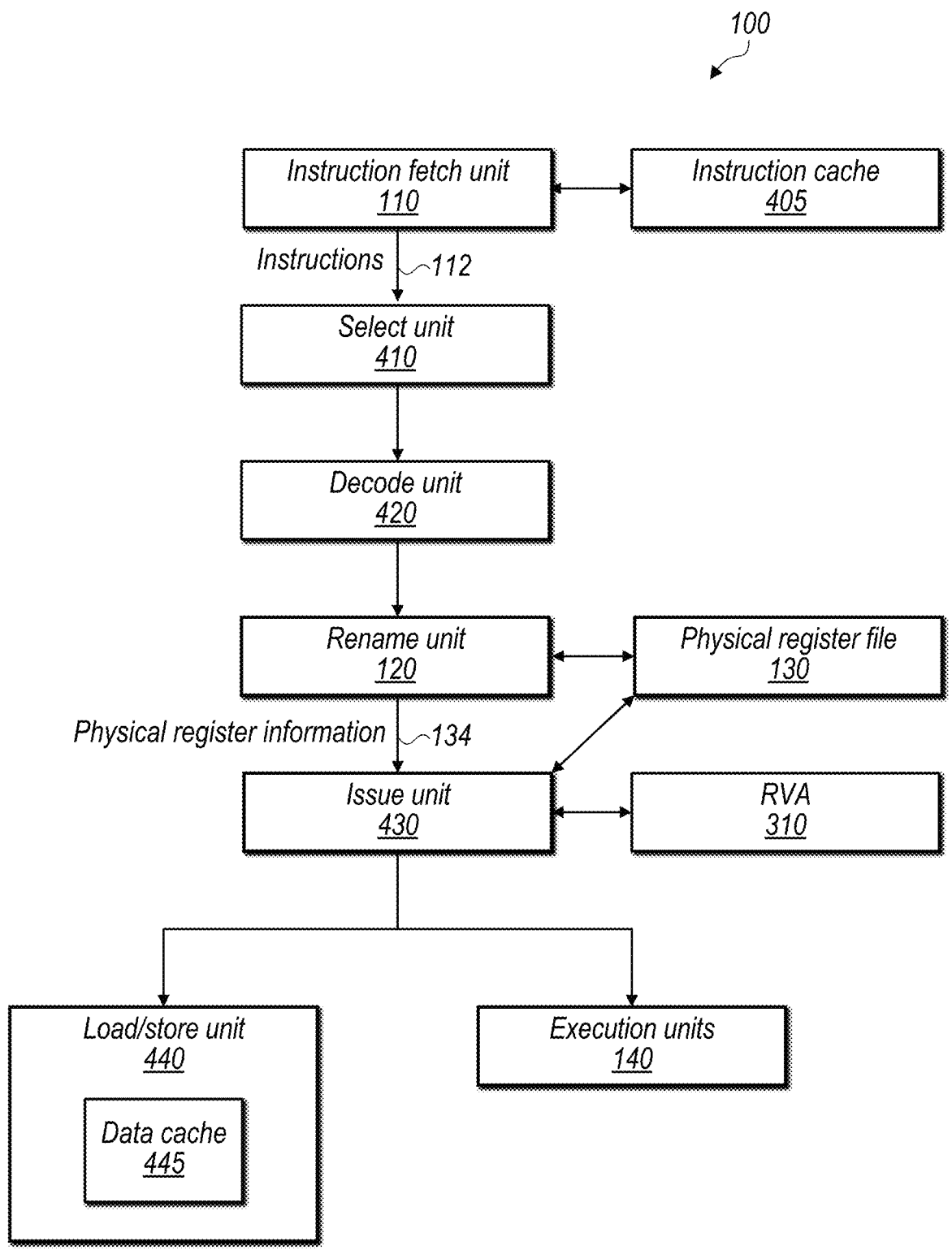
FIG. 4 is a block diagram illustrating an example of a processor pipeline configured to implement physical register sharing.

FIG. 4 is a block diagram illustrating an example processor pipeline configured to implement physical register sharing. In the illustrated embodiment, processor 100 is configured to execute instructions 112 and to process data according to a particular Instruction Set Architecture (ISA). It is contemplated that any desired ISA may be employed, such as ARM, x86, PowerPC® or MIPS®, for example. Additionally, in some embodiments each instance of processor 100 may be configured to execute multiple threads concurrently, where each thread may include a set of instructions 112 that may execute independently of instructions from another thread. In various embodiments it is contemplated that any suitable number of processors 100 may concurrently process some number of threads.

Instruction fetch unit (IFU) 110, in various embodiments, is configured to provide instructions 112 to the rest of processor 100 for execution. As shown, IFU 110 receives instructions from instruction cache circuitry 405, but may also receive instructions from other memory circuits. Fetch unit 110 may also implement logic to handle misses at instruction cache 405 and translation of virtual instruction fetch addresses to physical addresses (e.g., fetch unit 110 may include an Instruction Translation Lookaside Buffer (ITLB)). Additionally, in some embodiments, fetch unit 110 may include logic to predict branch outcomes and/or fetch target addresses, such as a Branch History Table (BHT), Branch Target Buffer (BTB), or other suitable structure(s), for example.

Select unit circuitry 410, in various embodiments, is configured to attempt to select an instruction 112 to schedule for execution. In a simple embodiment, select unit 410 selects the last-fetched instruction in a FIFO instruction buffer. In the multi-threaded context, select unit 410 may employ a least-recently-picked (LRP) algorithm in which the least recently picked thread within a given thread group that is ready for execution is selected. Further, it is contemplated that in some embodiments of processor 100 (e.g., those having multiple execution units 140), select unit 410 may be configured to select more than one instruction for execution in a given execution cycle. In one embodiment, select unit 410 is configured to identify operand dependencies between a given picked instruction and a previously issued instructions. Select unit 410 may include logic to appropriately select source operands (e.g., from a register file, or from a previous execution cycle via bypass logic).

Decode unit circuitry 420, in the illustrated embodiment, is configured to further prepare instructions selected by select unit 410 for execution. In the illustrated embodiment, decode unit 420 may be configured to identify the architected registers specified by instructions 112. Additionally, decode unit 420 may also determine whether the instruction is to be forwarded to an execution unit 140 or load/store unit circuitry (LSU) 440 based on the operands.

As shown, rename unit 120 is configured to forward physical register information 134 for corresponding physical registers 132 (or physical register portions) of architected registers in instructions 112. Additionally, rename unit 120 may also perform register renaming with physical register sharing for decoded architected registers that are not renamed yet, as described in more detail with respect to FIG. 2. In some cases, this renaming may include partitioning a physical register of PRF 130 into multiple portions e.g., for a W-rename.

Issue unit circuitry 430, in various embodiments, is configured to fetch operands for instructions 112 and schedule instructions for issuance to execution units 140 or LSU 440. As shown, issue unit 430 is configured to receive physical register information 134 and use it to fetch operands from physical register file 130. Then, issue unit 430 issues instructions with fetched operands for execution. Issue unit 430 may also be configured to arbitrate between instructions for out-of-order execution, or to determine which one of multiple execution units 140 to issue the instruction to.

In some cases, issue unit 430 is further configured to determine and resolve register dependencies using RVA 310 prior to issuing certain instructions. For example, consider a RAW dependency (described above) in which issue unit 430 is attempting to issue a read operation of a register with a pending write. Issue unit 430 may, after detecting that the register being accessed is not valid yet due to a pending write to that register, hold the read operation in a buffer until the write is written back to PRF 130 and reflected at RVA 310, allowing for reads following the write.

Execution units 140, in various embodiments, are configured to execute and provide results for certain types of instructions issued from IFU 110. It is contemplated that in some embodiments, processor 100 may include more execution units 140, and execution units 140 may or may not be symmetric in functionality. In some embodiments, once an instruction is executed in execution unit 140, execution unit 140 produces a result that is to be stored in physical register file 130. Thus, execution unit 140 may write (e.g., via RF read/write ports 210 during a write-back stage of the pipeline), instruction results back to corresponding registers of PRF 130 using physical register information 134.

Load store unit 440, in various embodiments, is configured to process data memory references, such as integer and floating-point load and store instructions as well as memory requests. Load/store unit 440 may include a data cache circuitry 445 as well as logic configured to detect cache misses and to responsively request data from a higher-level cache (not shown in FIG. 4).

Figure 5A:
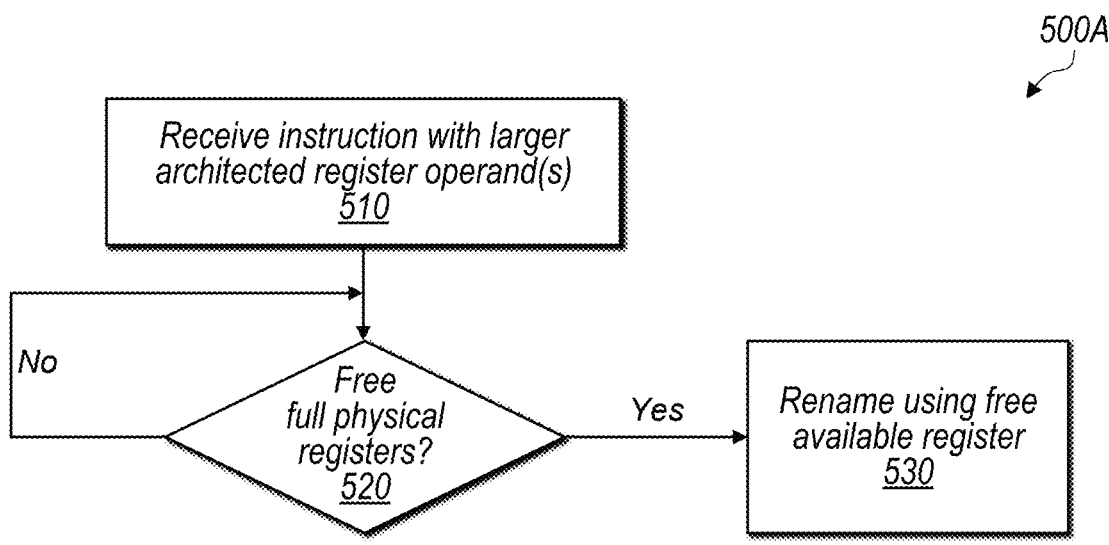
FIGS. 5A-B are flow diagrams illustrating examples of architected register assignments.
Figure 5B:
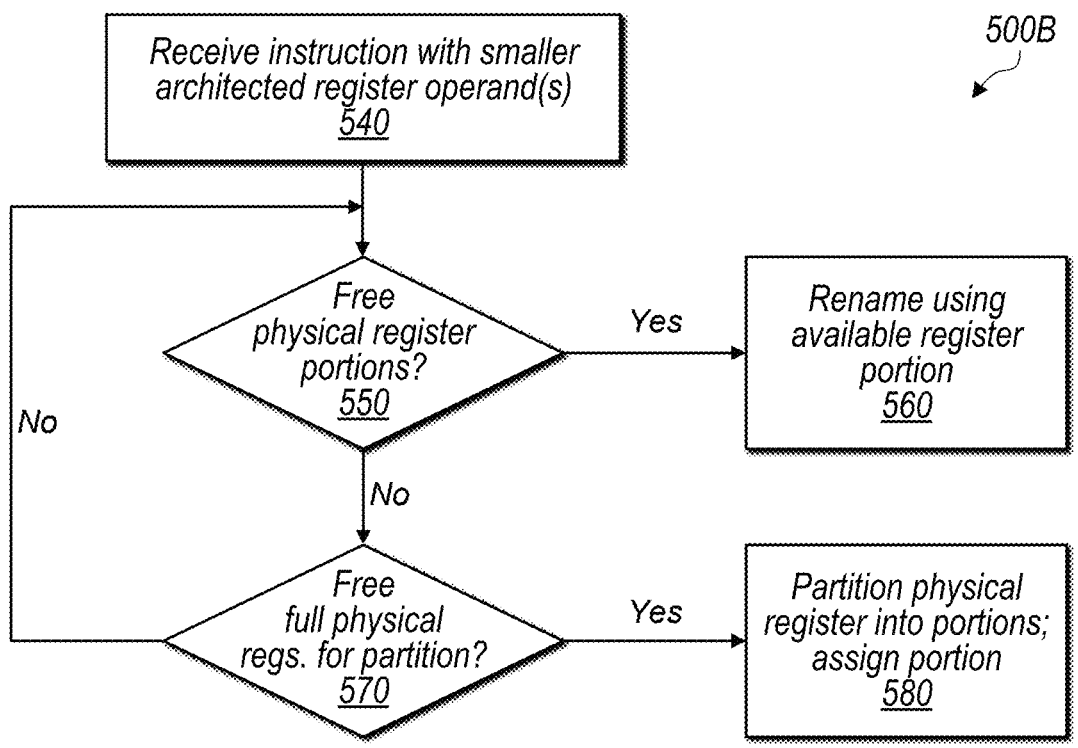

FIGS. 5A-B describe the rename processes for architected registers of various sizes: FIG. 5A describes an X-rename, while FIG. 5B describes a W-rename. In some embodiments, rename unit 120 is configured to implement either process by communicating to various components. For example, rename unit 120 may, after determining an assignment of an architected register to a physical register, change one or both bits of the free list 240 entry corresponding to the physical register, change the register map table 220 to reflect the assignment, or update the corresponding RVA 310 entry to reflect the assignment.

FIG. 5A depicts a rename process 500A for an architected register of the largest size. As shown, the processor first receives at 510 an instruction with an operand that includes an architected register of the largest size. Then at 520, the processor checks (e.g., via picker circuit 250) whether there are available physical registers for the largest architected register (i.e., all portions of the physical register are free and not used by smaller architected registers). If there are available registers for the rename, then the processor moves on to step 530 where it performs the rename of the architected circuit using the available physical register. Otherwise, if there are no available physical registers, then the processor performs a pipeline stall at 520 until a physical register becomes available. In some cases as noted, processor 100 may be configured to maintain a minimum number of physical registers for X-renames to avoid running out of space for storing inflight data within the processor pipeline.

FIG. 5B describes a rename process 500B for an architected register of a smaller size. As shown, the processor first receives at 540 an instruction with an operand that includes an architected register of the smaller size, which may be half or a quarter of the largest size. Then at 550, the processor checks (e.g., via picker circuit 250) whether there are available portions of physical registers for the smaller architected register (e.g., there is at least a portion of the physical register that was already partitioned). If there is an available physical register portion, then the processor proceeds with the rename at 560.

If there are no available physical register portions, then the processor checks at 570 whether there are any physical registers that are available for partitioning. This may include, in some cases, checking whether 1) there are physical registers with all portions available, and 2) that the number of available physical registers exceeds a threshold minimum to prevent starving renames for future architected registers of the largest architected size. If there are available registers for partition, the processor partitions the physical register at 580 into portions and assigns a physical register portion to the requested architected register.

Figure 6:
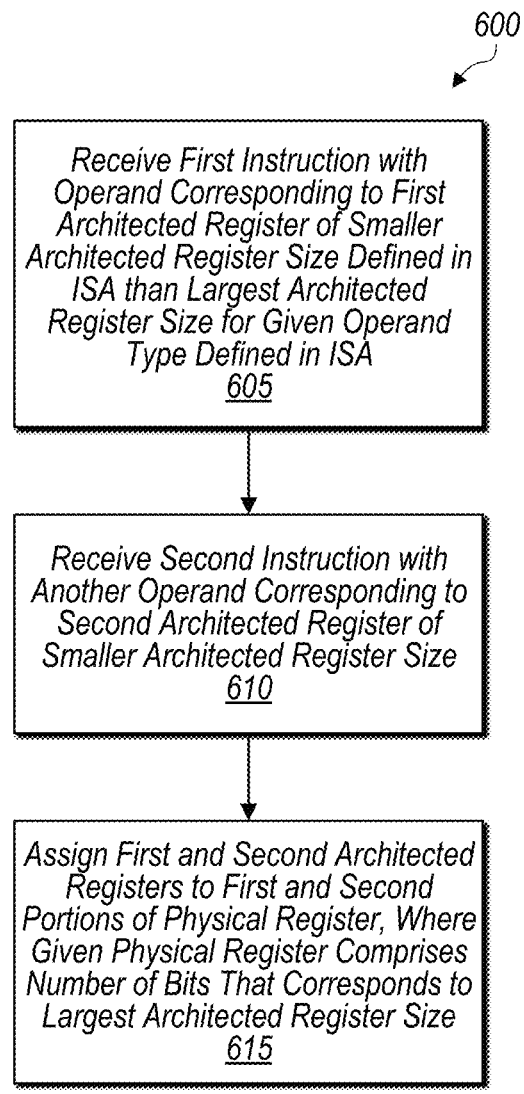
FIG. 6 is a flow diagram illustrating an example method for physical register sharing.

Turning now to FIG. 6, a flow diagram of a method 600 for register sharing is depicted. Method 600 is one embodiment of a method performed by a computing device such as processor 100, which may include register rename unit 120. In some instances, performance of processor 100 may allow for processor 100 to accommodate more registers by partitioning a physical register (e.g., register P1 of FIG. 1) to be assigned to two smaller architected registers (e.g., registers W2 and W3 of FIG. 1).

In step 605, a processor (e.g., processor 100) implementing an ISA receives a first instruction with an operand corresponding to a first architected register (e.g., register W2) of a smaller architected register size defined in the ISA than a largest architected register size for a given operand type defined in the ISA.

In step 610, the processor receives a second instruction with another operand corresponding to a second architected register (e.g., register W3) of the smaller architected register size.

In step 615, a register rename circuit (e.g., register rename unit 120) assigns the first and second architected registers to first and second portions (e.g., lower and higher bits) of one of a plurality of physical registers (e.g., register P1), where a given physical register of the plurality of physical registers comprises a number of bits that corresponds to the largest architected register size.

In some embodiments, the register rename circuit further assigns the first physical register (e.g., register P2) as a rename for a first portion (e.g., register X3 Lo) of a third architected register of the largest architected register size, and assign a second physical register (e.g., register P3) as a rename for a second portion (e.g., register X3 Hi) of the third architected register. The register rename circuit may further assign a third physical register (e.g., register P0) as a rename for the third architected register (e.g., register X0) of the largest architected register size.

The register rename circuit may maintain a threshold number of physical registers available to be assigned as renames for architected registers having the largest architected register size, determine, based on receiving a rename request for an architected register of the second architected register size, that performing the rename request would violate the threshold number, and stall, based on the determining, the rename until more physical registers are available such that the threshold number is no longer violated by performing the rename request.

In some embodiments, the processor further comprises a free list circuit (e.g., free list 240) configured to track availabilities of portions of the physical registers for rename. The free list may maintain free list entries for the plurality of physical registers, where a given free list entry for a given physical register includes a plurality of bits, where a first of the plurality of bits indicates availability of a first portion of the given physical register, and a second bit indicates availability of a second portion of the given physical register. Thus, the free list entry may include more than two bits in cases where more than two portions of a physical register can be assigned for smaller architected register renames. The register rename circuit may determine, for the given physical register, whether to assign the given physical register as a rename for an architected register of the largest architected register size using an AND gate to perform a logical AND of the first and second bits in the free list entry corresponding to the given physical register. The register rename circuit may determine, for the given physical register, whether to assign the given physical register as a rename for an architected register of the second architected register size using an XOR gate to perform a local XOR of the first and second bits in the free list entry corresponding to the given physical register.

In some embodiments, the processor further comprises a register valid array circuit (e.g., RVA 310) configured to indicate validity of data stored in portions of physical registers. The register valid array circuit may maintain valid array entries for the plurality of physical registers, where a given free list entry for a given physical register includes a plurality of bits, such that a first of the plurality of bits indicates validity of data stored in a first portion of the given physical register, and a second of the plurality of bits indicates validity of data stored in a second portion of the given physical register. Thus, the RVA list entry may include more than two bits in cases where more than two portions of a physical register can be assigned for smaller architected register renames.

In some embodiments, the selecting of a physical register as a rename for an architected register of the second architected register size further includes determining whether an available portion exists in physical registers that already have a renamed portion, and in response to determining that the available portion does not exist, selecting a portion of a physical register that has not been selected for a rename prior to the determining.

Example Device

Figure 7:
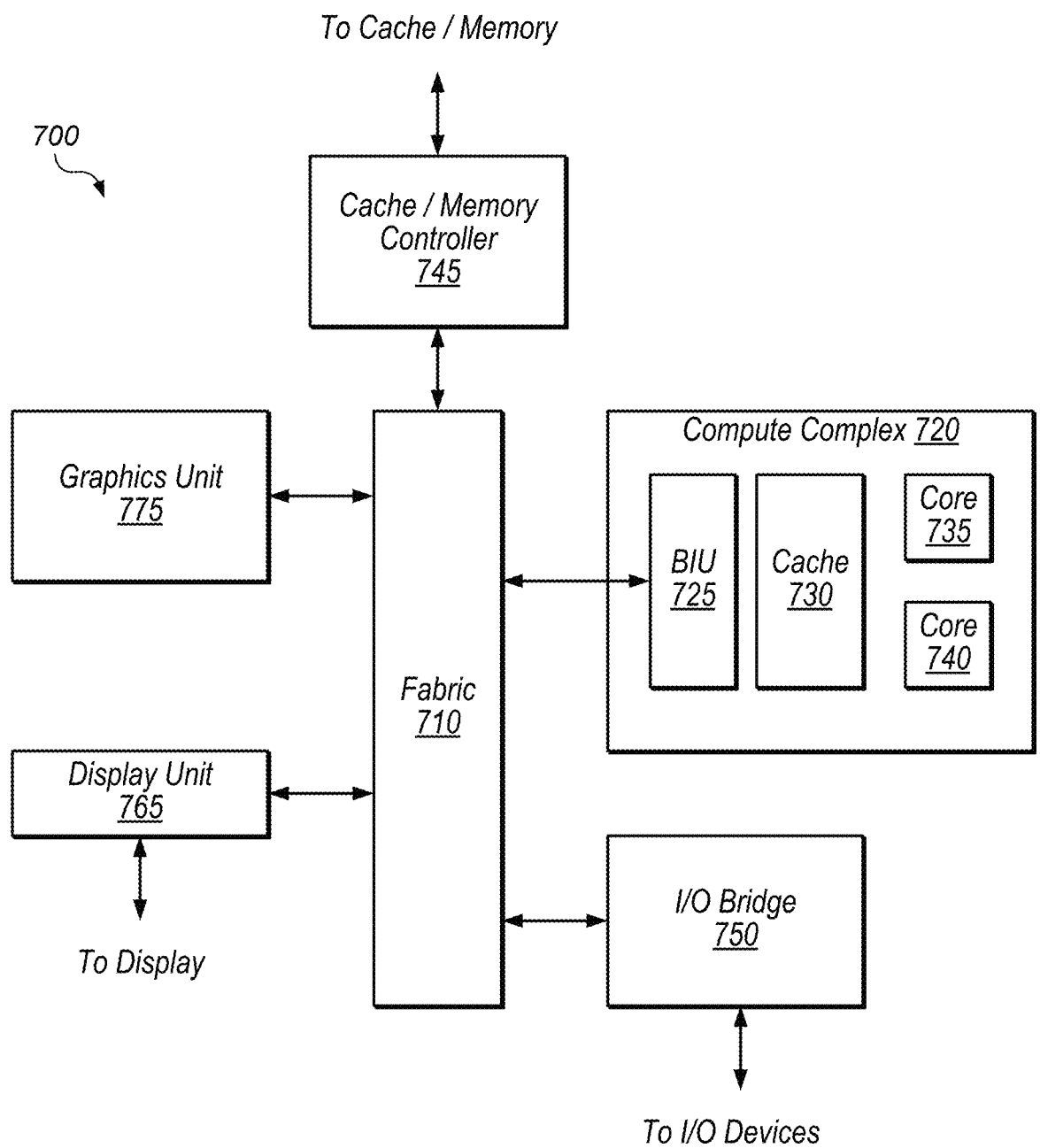
FIG. 7 is a block diagram illustrating an example computing device for implementing the disclosed techniques.

Referring now to FIG. 7, a block diagram illustrating an example embodiment of a device 700 is shown. In some embodiments device 700 may implement functionality of processor 100 or register rename unit 120. In some embodiments, elements of device 700 may be included within a system on a chip. In some embodiments, device 700 may be included in a mobile device, which may be battery powered. Therefore, power consumption by device 700 may be an important design consideration. In the illustrated embodiment, device 700 includes fabric 710, compute complex 720, input/output (I/O) bridge 750, cache/memory controller 745, graphics unit 775, and display unit 765. In some embodiments, device 700 may include other components (not shown) in addition to or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and caches. For example, compute complex 720 may include 1, 2, or 4 processor cores, or any other suitable number. In one embodiment, cache 730 is a set associative L2 cache. In some embodiments, cores 735 and 740 may include internal instruction and data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions. These instructions may be stored in computer readable medium such as a memory coupled to memory controller 745 discussed below.

As used herein, the term "coupled to" may indicate one or more connections between elements, and a coupling may include intervening elements. For example, in FIG. 7, graphics unit 775 may be described as "coupled to" a memory through fabric 710 and cache/memory controller 745. In contrast, in the illustrated embodiment of FIG. 7, graphics unit 775 is "directly coupled" to fabric 710 because there are no intervening elements.

Cache/memory controller 745 may be configured to manage transfer of data between fabric 710 and one or more caches and memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches. Memory coupled to controller 745 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 745 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 720 to cause the computing device to perform functionality described herein.

Graphics unit 775 may include one or more processors, e.g., one or more graphics processing units (GPUs). Graphics unit 775 may receive graphics-oriented instructions, such as OPENGL®, Metal®, or DIRECT3D® instructions, for example. Graphics unit 775 may execute specialized GPU instructions or perform other operations based on the received graphics-oriented instructions. Graphics unit 775 may generally be configured to process large blocks of data in parallel and may build images in a frame buffer for output to a display, which may be included in the device or may be a separate device. Graphics unit 775 may include transform, lighting, triangle, and rendering engines in one or more graphics processing pipelines. Graphics unit 775 may output pixel information for display images. Graphics unit 775, in various embodiments, may include programmable shader circuitry which may include highly parallel execution cores configured to execute graphics programs, which may include pixel tasks, vertex tasks, and compute tasks (which may or may not be graphics-related).

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and low-power always-on functionality, for example. I/O bridge 750 may also include interfaces such as pulse-width modulation (PWM), general-purpose input/output (GPIO), serial peripheral interface (SPI), and inter-integrated circuit (I2C), for example. Various types of peripherals and devices may be coupled to device 700 via I/O bridge 750.

In some embodiments, device 700 includes network interface circuitry (not explicitly shown), which may be connected to fabric 710 or I/O bridge 750. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 700 with connectivity to various types of other devices and networks.

Example Applications

Figure 8:
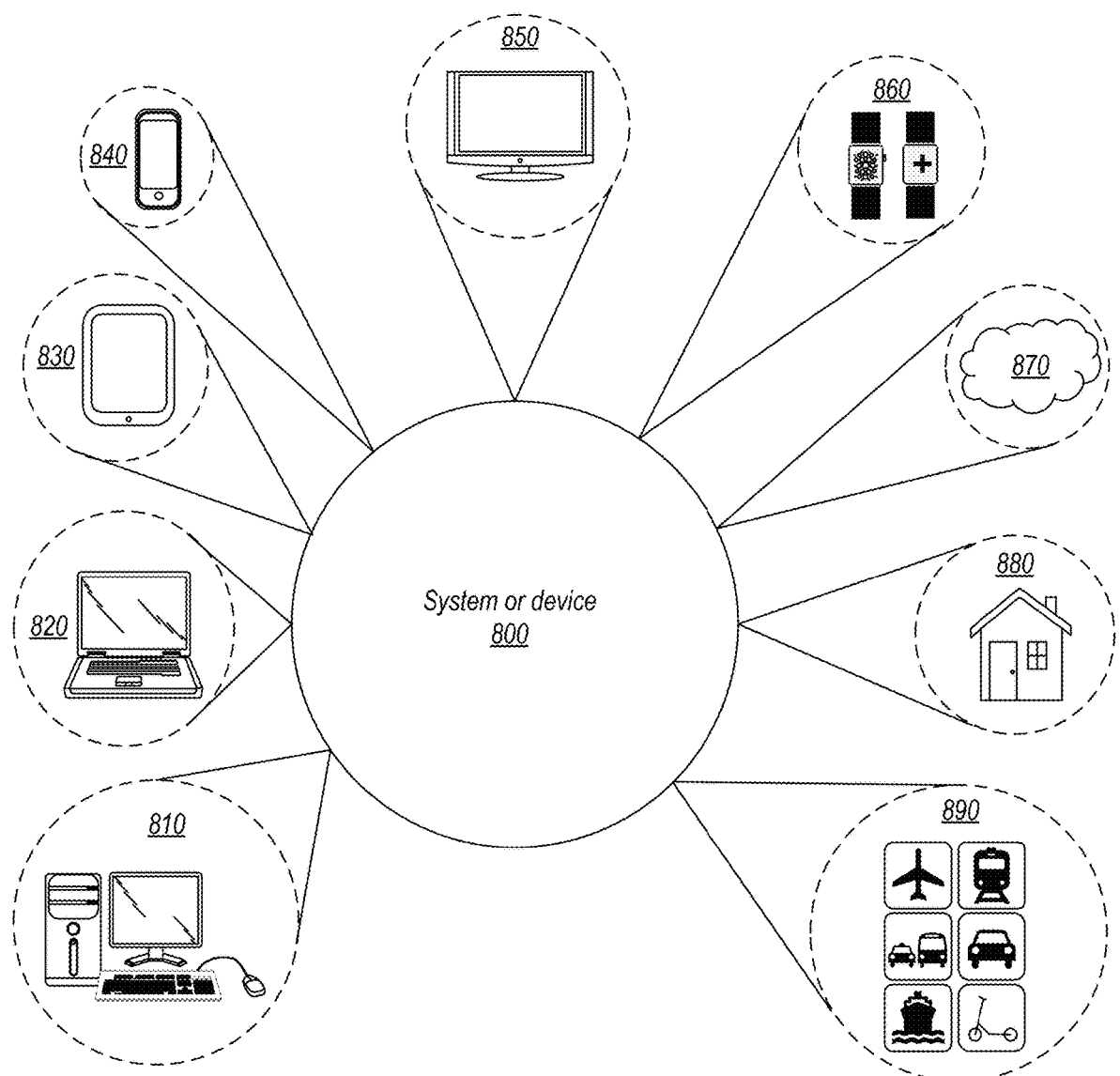
FIG. 8 is a diagram illustrating example applications for systems and devices employing the disclosed techniques.

Turning now to FIG. 8, various types of systems that may include any of the circuits, devices, or system discussed above. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 9:
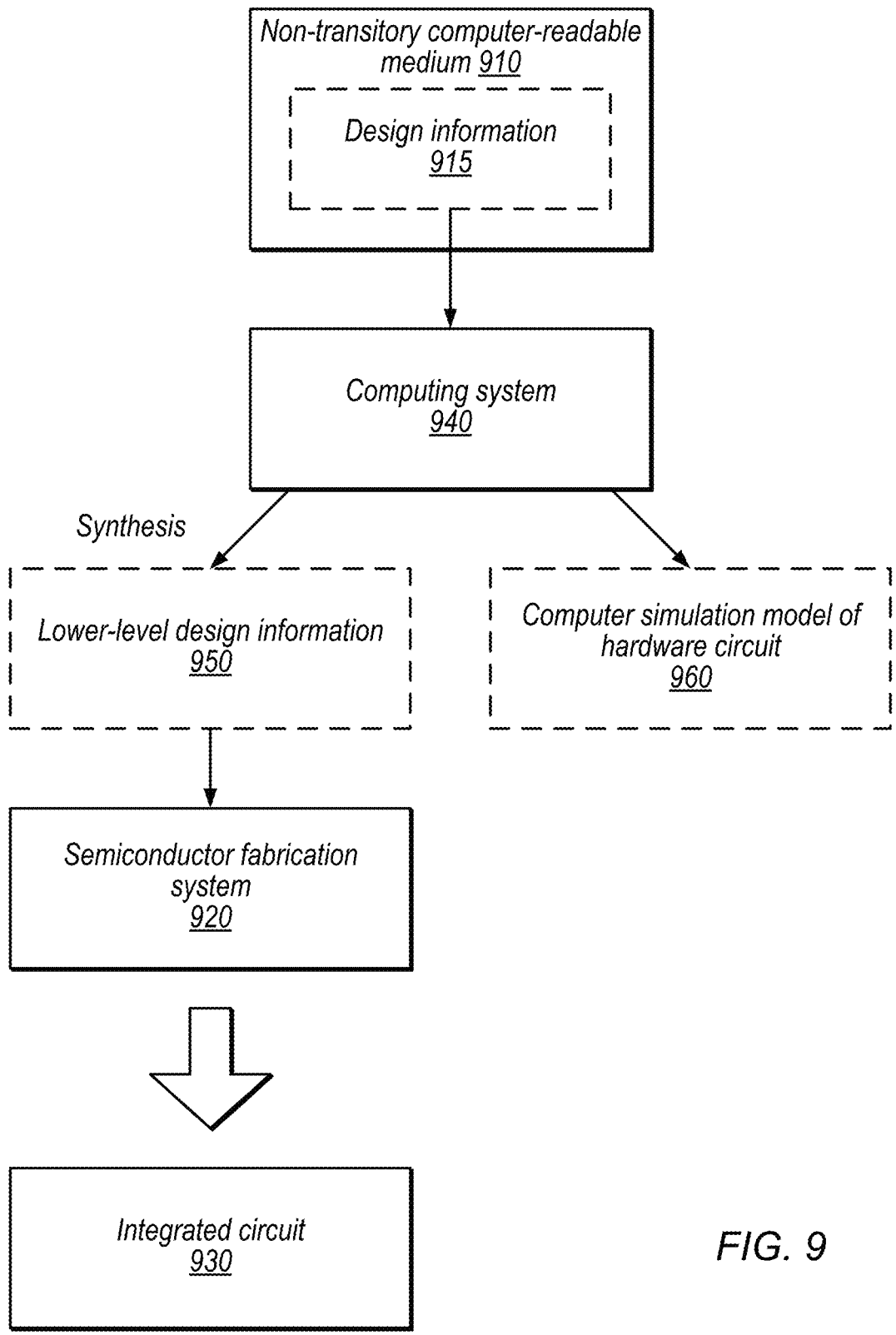
FIG. 9 is a block diagram illustrating an example computer-readable medium that stores circuit design information for implementing devices that employ the disclosed techniques.

FIG. 9 is a block diagram illustrating an example non-transitory computer-readable storage medium that stores circuit design information, according to some embodiments. In the illustrated embodiment, computing system 940 is configured to process the design information. This may include executing instructions included in the design information, interpreting instructions included in the design information, compiling, transforming, or otherwise updating the design information, etc. Therefore, the design information controls computing system 940 (e.g., by programming computing system 940) to perform various operations discussed below, in some embodiments.

In the illustrated example, computing system 940 processes the design information to generate both a computer simulation model of a hardware circuit 960 and lower-level design information 950. In other embodiments, computing system 940 may generate only one of these outputs, may generate other outputs based on the design information, or both. Regarding the computing simulation, computing system 940 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 940 also processes the design information to generate lower-level design information 950 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 950 (potentially among other inputs), semiconductor fabrication system 920 is configured to fabricate an integrated circuit 930 (which may correspond to functionality of the simulation model 960). Note that computing system 940 may generate different simulation models based on design information at various levels of description, including information 950, 915, and so on. The data representing design information 950 and model 960 may be stored on medium 910 or on one or more other media.

In some embodiments, the lower-level design information 950 controls (e.g., programs) the semiconductor fabrication system 920 to fabricate the integrated circuit 930. Thus, when processed by the fabrication system, the design information may program the fabrication system to fabricate a circuit that includes various circuitry disclosed herein.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Accordingly, non-transitory computer-readable storage medium 910 may include two or more memory media; such media may reside in different locations—for example, in different computer systems that are connected over a network.

Design information 915 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 940, semiconductor fabrication system 920, or both. In some embodiments, design information may also include one or more cell libraries that specify the synthesis, layout, or both of integrated circuit 930. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 930 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 and model 960 are configured to operate according to a circuit design specified by design information 915, which may include performing any of the functionality described herein. For example, integrated circuit 930 may include any of various elements shown in FIGS. 1-4. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 920 to fabricate integrated circuit 930.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on"

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A processor, comprising:
a hardware register file comprising a plurality of physical registers greater in number than a plurality of architected registers defined in an instruction set architecture (ISA) implemented by the processor, wherein a physical register of the plurality of physical registers comprises a number of bits that corresponds to a largest architected register size for a given operand type defined in the ISA; and
a register rename circuit configured to assign physical registers to architected registers of instructions presented to the register rename circuit, wherein a subset of instructions in the instruction set architecture use architected register operands that have a second architected register size smaller than the largest architected register size, and wherein the register rename circuit is configured to:
assign a first physical register of the plurality of physical registers as a rename for both a first architected register of the second architected register size and a second architected register of the second architected register size, and wherein the first architected register and the second architected register are separate and distinct architected registers in the ISA;
reserve a threshold number of physical registers for assignment as renames for architected registers having the largest architected register size;
determine, based on receiving a rename request for an architected register of the second architected register size, that performing a rename associated with the rename request would cause an available number of physical registers to fall below the threshold number; and
stall the rename associated with the rename request until more physical registers are available such that the available number is more than the threshold number.

2. The processor of claim 1, wherein the register rename circuit is further configured to:

assign the first physical register as a rename for a first portion of a third architected register of the largest architected register size; and assign a second physical register as a rename for a second portion of the third architected register.

3. The processor of claim 2, wherein the register rename circuit is further configured to assign a third physical register as a rename for the third architected register of the largest architected register size.

4. The processor of claim 1, further comprising:
a free list circuit configured to track availabilities of portions of the plurality of physical registers for rename.

5. The processor of claim 4, wherein the free list circuit is configured to:
maintain free list entries for the plurality of physical registers, wherein a given free list entry for a given physical register includes a plurality of bits, wherein:
a first of the plurality of bits indicates availability of a first portion of the given physical register; and
a second of the plurality of bits indicates availability of a second portion of the given physical register.

6. The processor of claim 5, wherein the register rename circuit is further configured to:
determine, for the given physical register, whether to assign the given physical register as a rename for an architected register of the largest architected register size using an AND gate to perform a logical AND of the first and second bits in the free list entry corresponding to the given physical register.

7. The processor of claim 5, wherein the register rename circuit is further configured to:
determine, for the given physical register, whether to assign the given physical register as a rename for an architected register of the second architected register size using an XOR gate to perform a logical XOR of the first and second bits in the free list entry corresponding to the given physical register.

8. The processor of claim 1, further comprising:
a register valid array circuit configured to indicate validity of data stored in portions of physical registers.

9. The processor of claim 8, wherein the register valid array circuit is configured to:
maintain valid array entries for the plurality of physical registers, where a given free list entry for a given physical register includes a plurality of bits, wherein:
a first of the plurality of bits indicates validity of data stored in a first portion of the given physical register; and
a second of the plurality of bits indicates validity of data stored in a second portion of the given physical register.

10. The processor of claim 1, wherein, to assign a physical register as a rename for an architected register of the second architected register size, the register rename circuit is further configured to:
determine whether an available portion exists in physical registers that already have a renamed portion; and
in response to determining that the available portion does not exist, select a portion of a physical register available to be assigned as a rename for architected registers having the largest architected register size.

11. A method, comprising:
receiving, at a processor implementing an instruction set architecture (ISA), a first instruction with an operand corresponding to a first architected register of a smaller architected register size defined in the ISA than a largest architected register size for a given operand type defined in the ISA;
receiving, at the processor, a second instruction with another operand corresponding to a second architected register of the smaller architected register size;
determining, by a register rename circuit of the processor, whether an assignment of the first and second architected registers as renames would cause an available number of physical registers for assignment to fall below a threshold number, wherein the threshold number is a number of physical registers reserved for assignment as renames for architected registers having the largest architected register size; and
in response to determining that the assignment of the first and second architected registers as renames would not cause the available number to fall below the threshold number, assigning, by the register rename circuit, the first and second architected registers to first and second portions of one of a plurality of physical registers, wherein a given physical register of the plurality of physical registers comprises a number of bits that corresponds to the largest architected register size, and wherein the first architected register and the second architected register are separate and distinct architected registers in the ISA.

12. The method of claim 11, further comprising:
assigning, by the register rename circuit, a third architected register of the largest architected register size to a second of the plurality of physical registers and a third of the plurality of physical registers.

13. The method of claim 12, further comprising:
storing, by the processor in response to the assigning of the third architected register:
upper bits of the third architected register in a portion of the second physical register; and
lower bits of the third architected register in a portion of the third physical register.

14. The method of claim 11, further comprising:
accessing, by the processor in response to a completion of a write to a given architected register, one or more corresponding entries in a register valid array to indicate a validity of the given architected register; and
verifying, by the processor prior to executing a given instruction with an operand corresponding to the given architected register, the validity of the given architected register based on the one or more accessed register valid array entries.

15. The method of claim 11, further comprising:
selecting, by the register rename circuit, a physical register as a rename for an architected register of the smaller architected register size, wherein the selecting includes:
determining, by the register rename circuit, that no partitioned physical register with at least one available portion for the rename and at least one unavailable portion for the rename is available; and
selecting, by the register rename circuit in response to the determining that no partitioned physical register is available, a physical register that is available for a rename of the largest architected register size.

16. A processor, comprising:
a hardware register file that includes a plurality of physical registers such that a physical register of the plurality of physical registers includes a number of bits that corresponds to a largest architected register size for an operand type defined in an instruction set architecture (ISA) implemented by the processor, wherein a subset of instructions in the instruction set architecture use architected register operands that have a second architected register size smaller than the largest architected register size; and a register rename circuit configured to:
- assign a first physical register of the plurality of physical registers as a first rename for both a first architected register of the second architected register size and a second architected register of the second architected register size; and
- reserve a threshold number of the plurality of physical registers for assignment as renames for architected registers having the largest architected register size, wherein, to reserve the threshold number, the register rename circuit is configured to:
  - determine that performing a rename request for an architected register of the second architected register size would cause an available number of the plurality of physical registers to fall below the threshold number; and
  - stall a rename associated with the rename request until the available number of the plurality of physical registers is more than the threshold number of the plurality of physical registers.

17. The processor of claim 16, wherein the register rename circuit is further configured to:
- assign a second physical register as a rename for a first portion of a third architected register of the largest architected register size; and
- assign a third physical register as a rename for a second portion of the third architected register.

* * * * *